United States Patent [19]

Cromeens

[11] Patent Number: 4,510,835
[45] Date of Patent: Apr. 16, 1985

[54] APPARATUS FOR GUIDING A POWERED CIRCULAR SAW ALONG AN ELLIPTICAL CUTTING PATH

[75] Inventor: Jeff Y. Cromeens, Mesquite, Tex.

[73] Assignee: Industrial Woodworking Machine Co. Inc., Garland, Tex.

[21] Appl. No.: 469,821

[22] Filed: Feb. 25, 1983

[51] Int. Cl.$^3$ .............................................. B27B 5/18
[52] U.S. Cl. .................. 83/471.2; 83/477.1; 83/490; 83/477.2; 83/483
[58] Field of Search ..................... 83/490, 471.2, 477.1, 83/484, 483, 477.2

[56] References Cited

U.S. PATENT DOCUMENTS

| | | | |
|---|---|---|---|
| 3,183,950 | 5/1965 | Sherman | 83/471.2 X |
| 3,263,716 | 8/1966 | Albers | 83/471.2 X |
| 4,030,393 | 6/1977 | Steiner | 83/490 X |

FOREIGN PATENT DOCUMENTS 935269  6/1982  U.S.S.R. ............................ 83/477.1

Primary Examiner—Donald R. Schran
Attorney, Agent, or Firm—Thomas L. Cantrell; Stanley R. Moore

[57] ABSTRACT

Apparatus for controlling the operating relationship of a rotatably driven circular saw blade to an adjacent workpiece includes a base carrying an elongated slide plate having a longitudinal slot adjacent one end. An indexing assembly is disposed between the base and the elongated slide plate and engages within the slot of the slide plate to constrain one of its ends to longitudinal movement, and a crank rotatably connects the base to the medial portion of the slide plate. A first motor is mounted on the other end of the slide plate to rotatably support the blade, and a second motor may be carried by the base for rotating the crank to move the slide plate from side to side and up and down along the slot and thereby move the saw blade along an elliptical path. In operation, the second motor turns the crank to cause the blade to be brought into contact with the workpiece along a path generally parallel with a major axis of the elliptical path.

2 Claims, 3 Drawing Figures

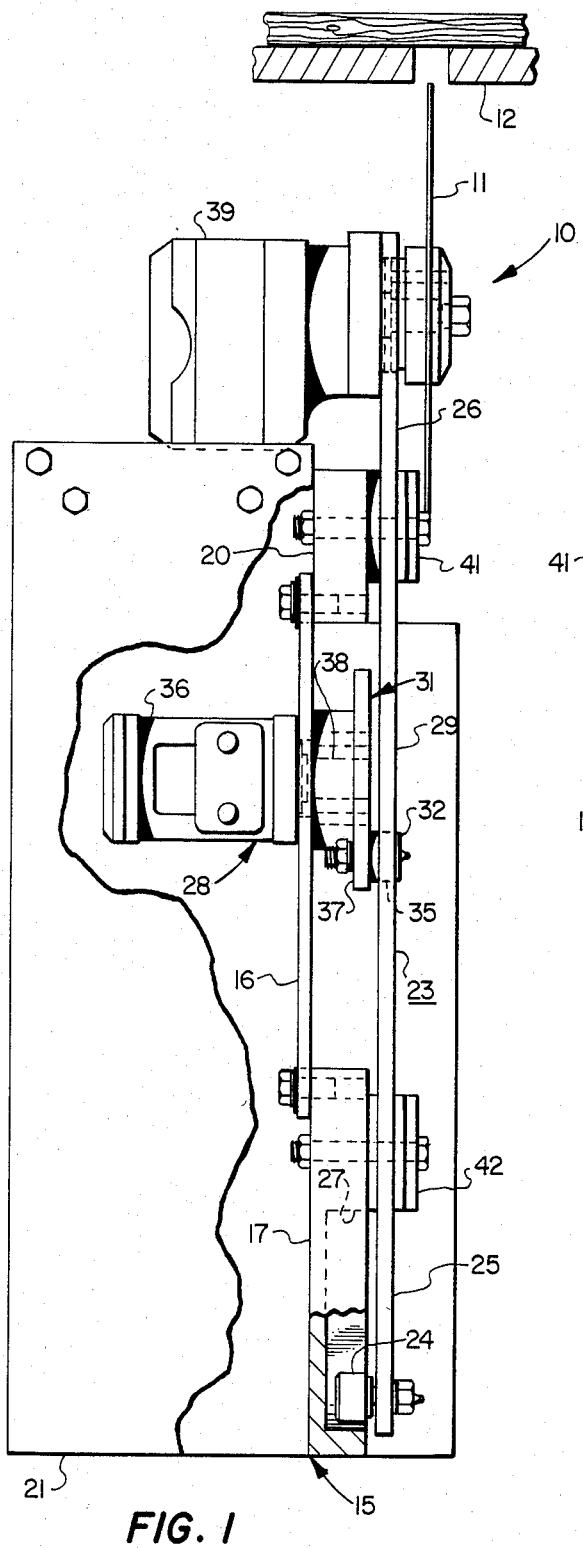
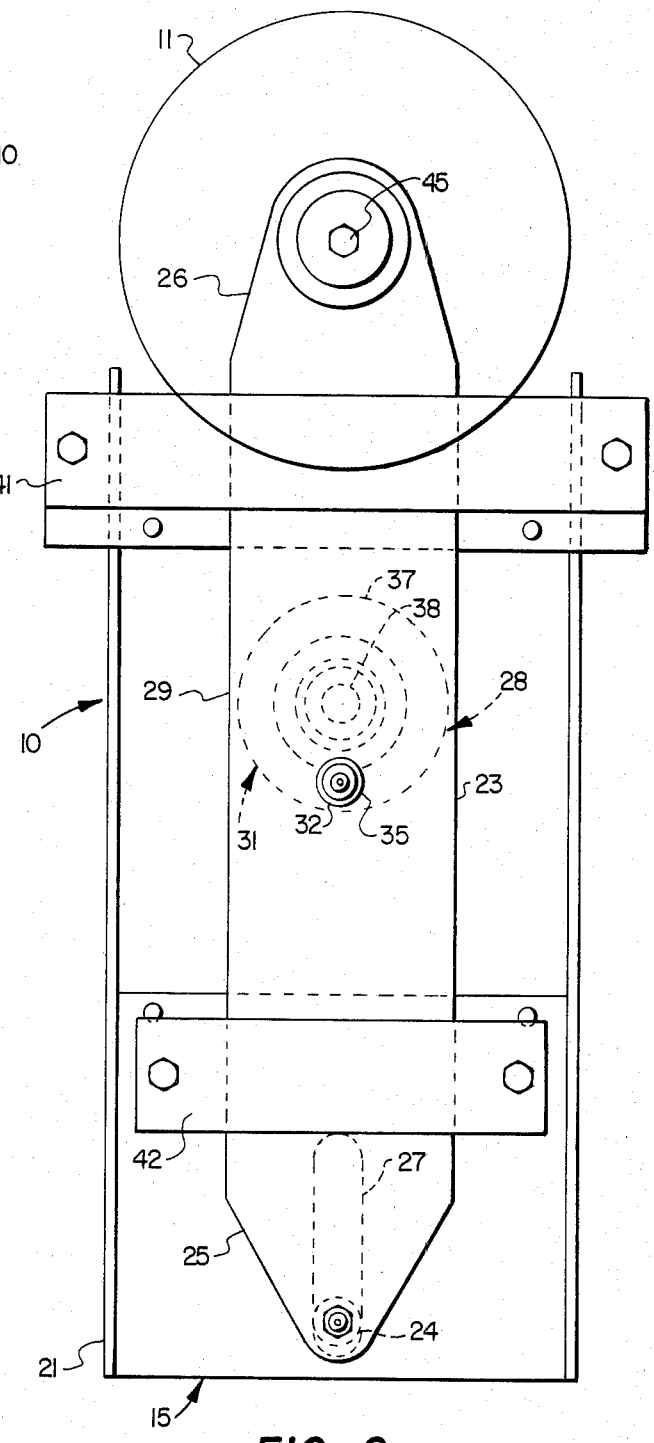
FIG. 1
FIG. 2

APPARATUS FOR GUIDING A POWERED CIRCULAR SAW ALONG AN ELLIPTICAL CUTTING PATH

BACKGROUND OF THE INVENTION

1. Field of the Invention

This invention relates to improvements in powered circular saws, and, more particularly, to improvements in apparatus for carrying such circular saws for the relatively high speed cutting of an adjacent workpiece transverse to a longitudinal axis of the workpiece.

2. Description of the Prior Art

In many industrial applications, the high speed transverse or cross cutting of elongated lumber, timber or other workpiece is required. One example of such cutting requirement is in the manufacture or production of timber or boards of predetermined or uniform length. For example, in some industrial processes, continuous lengths of board may be automatically produced in processes requiring periodic cut-off operations to achieve uniform board lengths. One such elongated board production process and apparatus is shown in U.S. Pat. No. 3,927,705, J. Y. Cromeens et al., assigned to the assignee hereof, and which discloses means and method for finger-jointing pieces of lumber to produce a continuous length of wood which can be cross cut to form boards or pieces of lumber of uniform length.

In this and other applications in which a circular cut-off saw is employed, often times the saw is arranged at a fixed work station, and as the lumber or workpiece to be cut is moved past the saw, periodically the saw is moved with a linear motion perpendicular to a longitudinal axis of the workpiece and directly into the center of a face of the workpiece. In such operations, the cutting by the saw begins at the central location in the workpiece and progress laterally outwardly in opposite directions from the point of intial saw contact. As the saw blade progresses into the workpiece from the center toward the edges, the load upon the saw increases to a maximum level prior to the saw cutting or breaking through the opposite face of the workpiece. It can be seen that with sawing apparatuses of this type, a saw blade of diameter larger than the width of the workpiece to be cut must be used, since the blade must be passed completely through the workpiece beginning at the central location.

Also, since the saw blade is of larger diameter than the smaller blade enabled by the present invention, as below described, a larger flywheel effect is experienced requiring longer times to coast to a stop after use or in system shut-down operations.

SUMMARY OF THE INVENTION

In light of the above, it is, therefore, an object of the invention to provide an improved powered circular saw.

It is another object of the invention to provide an improved apparatus for carrying a powered circular saw.

It is another object of the invention to provide an apparatus of the type described having reduced saw blade size requirements.

It is another object of the invention to provide an apparatus of the type described having reduced saw blade power requirements.

It is another object of the invention to provide an apparatus of the type described in which the saw is moved through a workpiece in a fashion in which the load on the saw is relatively constant throughout the cutting process.

It is another object of the invention to provide an apparatus of the type described which does not experience high peak power requirements during the cut through the workpiece.

It is another object of the invention to provide an apparatus of the type described which can be achieved with minor modifications to existing saw blade carrying equipment.

It is still another object of the invention to provide an apparatus of the type described which can be incorporated into automatic lumber forming machinery.

These and other objects, features and advantages will become apparent to those skilled in the art from the following detailed description when read in conjunction with the accompanying drawings and appended claims.

BRIEF DESCRIPTION OF THE DRAWINGS

The invention is illustrated in the accompanying drawing in which:

FIG. 1 is a side elevational view, partially cut away, of a saw carrying apparatus in operative relationship to an adjacent workpiece;

FIG. 2 is a front elevational view of the saw carrying apparatus of FIG. 1; and

In the various figures of the drawing, like reference numerals are used to denote like or similar parts.

DETAILED DESCRIPTION OF A PREFERRED EMBODIMENT

Figure 3:
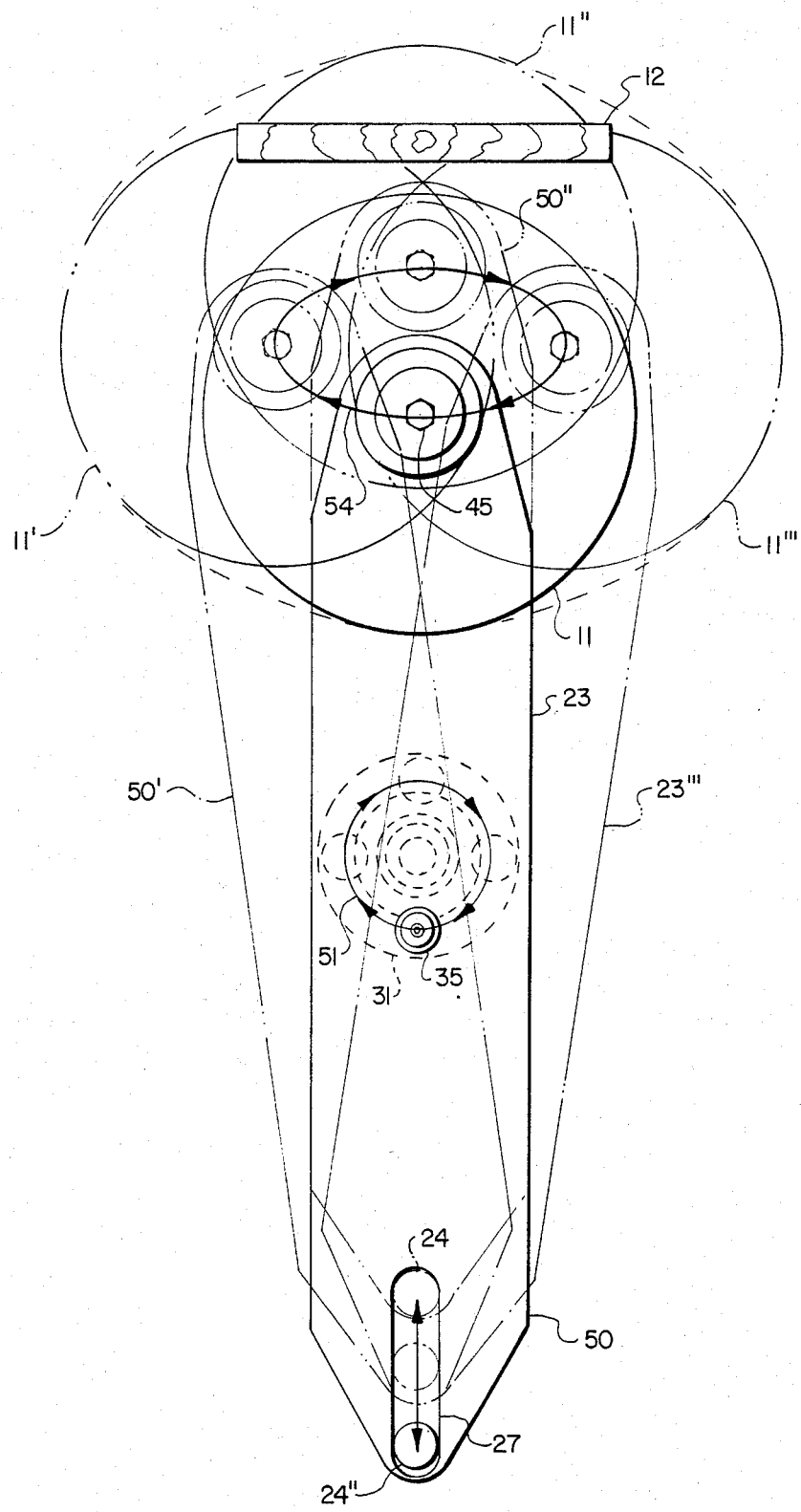
FIG. 3 is a front elevational diagramatical view of the saw blade and movement producing mechanisms to show said saw blade at various operative positions with respect to an adjacent workpiece, illustrating the paths of the various parts of the apparatus during operation.

In accordance with a preferred embodiment of the invention, an apparatus 10 is illustrated in FIGS. 1 and 2 for mounting and operating a rotary circular saw blade 11 to cut an adjacent workpiece 12. The apparatus 10 includes a base 15 which may be used in conjunction with other lumber forming apparatuses (not shown) or which may be used in a stand alone fashion for cross cutting adjacent workpieces moved or positioned at a fixed or stationery work station. The base 15 includes an upright mounting plate 16 and a lower bearing assembly 17 having its upper end attached to the lower end of the mounting plate. An upper connection plate 20 has its lower end secured to upper end of the mounting plate to complete the front of the base of the apparatus. If desired, an exterior frame 21 may be provided to support the apparatus 10 including the mounting plate, the lower bearing assembly, and the upper connection plate.

An elongated upright slide member or plate 23 for supporting at its upper end a motor 36 for driving saw blade 11 overlies the faces of mounting plate 16, lower bearing assembly 17 and upper connection plate 20 in a fashion below described in detail. The slide plate 23 is disposed generally parallel to and spaced from the mounting plate and includes indexing means, such as a roller or bearing member 24, carried by its lower end 25 opposite its upper end 26 at which the saw blade is mounted. The lower bearing assembly 17 has an upright elongated recess or slot 27 to receive and confine indexing roller 24, whereby said indexing roller 24 and the upright recess 27 serve to constrain or restrict the movement of the lower end of the upright slide plate 23 to longitudinal or linear, upright reciprocation. It should be noted that the respective locations of the indexing roller and the elongated recess or slot may be reversed if desired; that is, said recess may be formed in the back of or extend through the slide plate, and said roller may be mounted on the lower bearing assembly. if desired, for ease of manufacture or to effect a somewhat different orbital path of the saw blade.

At an intermediate point 29 of the upright slide plate 23, a motor driven crank assembly 28 is rotatably mounted. The crank assembly 28 includes a crank 31 having a roller or rotatable bearing 32 at one end mounted on the slide plate at a centrally located opening 35. The crank 31 has its other end connected to motor 36 so as to be turned or driven thereby in the operation of the apparatus 10. As shown, the crank 31 may comprise a circular plate 37 mounted on a horizontal transverse drive shaft 38 of the motor. The roller or rotatable bearing 32 is mounted on circular plate 37 near its peripheral edge and is adapted to be driven along a circular path centered about the drive shaft 38. If desired, a speed reducing gearing mechanism (not shown) may be included between the drive shaft and the circular plate to adjust the rotation rate of said plate as needed.

The roller or rotatable bearing 32 is secured to circular plate 37, as shown in FIG. 1, and is rotatably connected to the intermediate portion of slide plate 23 so that, as said bearing is driven along its circular path, said intermediate portion of said slide plate is also driven to follow said circular path. This produces respective linear reciprocation of the lower end 25 of the slide plate and elliptical rotation of the upper end 26 of said slide plate, as below described in detail.

A motor 39 for driving the saw blade 11 is mounted on drive shaft 38 at the upper end 26 of slide plate 23. The motor can be of any commercially available type for powering a circular saw blade; for instance, such as those motors (not shown) which include "V" belt driving means with associated pulleys to drive the saw blade, or, as shown, such as hydraulic type motors, as will be apparent to those skilled in the art.

First and second bearing slide plates 41 and 42 are disposed in overlying relation to slide plate 23 to constrain it from movement other than up and down and side to side to develop the saw blade path desired, as below described.

The operation of the apparatus 10 is presently described with particular reference to FIG. 3. Assuming that the operation is begun from a "home" position, denoted by the reference numeral 50, slide plate 23 is vertically oriented; indexing roller or bearing member 24 is at the bottom of its reciprocation within the recess or slot 27; and crank 32 is positioned with rotatable bearing 35 at the bottom of its travel. The saw blade 11 at this "home" position is directly below and spaced from the workpiece 12. The motor 36 then is energized to turn crank 31, thereby moving its roller 32 clockwise along a circular path 51. As the crank is rotated, slide plate 23 is moved upwardly with its top portion being moved to the left and the bottom portion being permitted to move only linearly by the coaction of indexing roller 24 and slot 27. After the crank has been rotated 90 degrees, the slide plate is located as indicated by the reference numeral 50'. At this position 50', the saw blade, as indicated by 11', has cut an initial portion of the workpiece 12 starting at its left side. It should also be noted that the axis or center 45 of the saw blade is moved in the operation of the apparatus 10 along an elliptical path 54.

As the crank 31 continues its rotation, the slide plate is moved to a vertical orientation at the top of its path of travel, indicated by reference numeral 50", and the saw blade 11" has at this point cut more fully into the workpiece 12. At this top location 50", the indexing roller is located at the upper end of slot 27, as indicated by reference numeral 24". At this juncture, it should be noted that saw blade 11, having travelled in the direction of the workpiece 12 to its maximum extent, has not completely cut through said workpiece, illustrating the reduction in blade diameter requirements of the invention.

As the crank 31 is rotated further, the slide plate 23 is moved downwardly, with its top end being moved to the right, to the positions indicated by 23''' and 11'''. At this position, the saw blade 11''' has cut completely through the workpiece 12.

Finally, as the crank 31 continues its rotation, the slide plate and saw blade are brought back to their home position in preparation for subsequent cutting operations.

It should be emphasized that the operation of the motor 36 and crank 31 serve to move the slide plate 23 back and forth and up and down during the rotation of the bearing 32 about its circular path. Since the lower end of the blade carrying slide plate is constrained strictly to up and down motion by the interaction of the indexing roller or bearing 24 within the slot 27, the centerpoint 45 of the saw blade 11 is caused to travel in an elliptical path having its major axis parallel to the transverse axis of the workpiece 12. Thus, with reference now to FIGS. 1 and 3, as the center 45 of the saw blade is caused to traverse the elliptical path and said saw blade brought into contact with the adjacent workpiece 12 from left to right shown in FIG. 3, it can be seen that after said blade has initially penetrated the wood, the load on said blade is relatively constant until it has completely cut through said workpiece. The saw blade 11, after the cut, is then moved out of contact with the workpiece 12. In automatic machinery applications, the period of the elliptical cycle can be timed such that the workpiece 12 can be repositioned to locate the area of the next desired cut in operative relationship to the saw blade for the next subsequent cutting process during the time that the blade traverses the portion of the path away from said workpiece 12.

It can be particularly seen that since the saw blade need not traverse the entire width of the workpiece 12 all at one time, the overall blade diameter can be significantly reduced from that heretofore required in any particular application. The reduced diameter, of course, reduces the mass in the saw blade and reduces the flywheel effect which said blade would otherwise experience due to the saw blade mass.

Although the invention has been described and illustrated with a certain degree of particularity, it is understood that the present disclosure is made by way of example only and that numerous changes in the combination and arrangement of parts may be resorted to by those skilled in the arts without departing from the spirit and the scope of the invention as hereinafter claimed.

I claim:

1. Apparatus for controlling the operating relationship of a rotatably driven saw blade to an adjacent workpiece comprising:
   a base member,
   an elongated slide member adjacent the base member and carrying the saw blade,
   indexing means between said base member and one end of the slide member to constrain said one end of said slide member to linear movement,
   a first motor mounted at the opposite end of said slide member for driving the blade,
   the indexing means having guide means extending longitudinally of said slide plate,
   said guide means comprising an elongated recess in one of said base and slide members, a roller mounted on the other of said members and oriented to engage the recess in said one of said members to constrain the movement of said one end of said slide member to linear movement,
   crank means rotatably connected to the center portion of said slide member, and
   a second motor carried by said base member for rotating the crank means to move the said slide member from side to side and up and down relative to said base member to move the center of the blade along an elliptical path,
   whereby operation of the second motor causes the blade to be brought into contact with the workpiece along a path generally parallel with a major axis of the elliptical path.

2. Apparatus for controlling the operating relationship of a rotatably driven saw blade to an adjacent workpiece comprising:
   a base member,
   an elongated side member adjacent the base member and carrying the saw blade,
   indexing means between said base member and one end of said slide member to constrain said one end of said slide member to linear movement,
   a first motor mounted at the opposite end of said slide member for driving the blade,
   the indexing means having guide means extending longitudinally of said slide plate,
   said guide means comprising
   a slot in said base member extending longitudinally of said slide member,
   means carried on said one end of said elongated slide member and oriented to engage the slot in said base member;
   crank means rotatably connected to the center portion of said slide member, and
   a second motor carried by said base member for rotating the crank means to move said slide member from side to side and up and down relative to said base member to move the center of the blade along an elliptical path,
   whereby operation of the second motor causes the blade to be brought into contact with the workpiece along a path generally parallel with a major axis of the elliptical path.

* * * * *